United States Patent
McGlynn

(12) 
(10) Patent No.: US 6,761,401 B1
(45) Date of Patent: Jul. 13, 2004

(54) TELESCOPING MOTORCYCLE SEAT BACKREST

(76) Inventor: Leo D. McGlynn, 329 - 7th Ave. North, Fort Dodge, IA (US) 50501

( * ) Notice: Subject to any disclaimer, the term of this patent is extended or adjusted under 35 U.S.C. 154(b) by 0 days.

(21) Appl. No.: 10/404,735

(22) Filed: Apr. 1, 2003

(51) Int. Cl.⁷ .................................................. B62J 1/00
(52) U.S. Cl. ........................... 297/215.12; 297/195.12; 297/211; 297/215.13
(58) Field of Search ...................... 297/215.12, 195.12, 297/195.11, 211, 215.13, 410; 280/304.4, 288.4

(56) References Cited

U.S. PATENT DOCUMENTS

| | | | |
|---|---|---|---|
| 1,113,833 A | * 10/1914 | Ruff | 297/301.4 |
| 3,307,874 A | * 3/1967 | Wilson | 297/410 |
| 3,698,765 A | * 10/1972 | Olsen | 297/396 |
| 3,822,917 A | 7/1974 | George | |
| 3,913,974 A | 10/1975 | Bowen | |
| 4,462,634 A | 7/1984 | Hanagan | |
| 4,466,660 A | * 8/1984 | Mabie | 297/215.11 |
| 4,570,998 A | 2/1986 | Hughes | |
| 4,679,647 A | 7/1987 | Komuro | |
| 4,822,102 A | * 4/1989 | Duvenkamp | 297/403 |
| 4,953,911 A | 9/1990 | Hanagan | |
| 4,978,167 A | * 12/1990 | Harvey | 297/215.13 |
| 5,441,330 A | * 8/1995 | Rojas | 297/383 |
| 5,544,937 A | 8/1996 | Hanagan | |
| 5,608,957 A | 3/1997 | Hanagan | |
| 5,860,703 A | * 1/1999 | Courtois et al. | 297/410 |
| 6,007,150 A | 12/1999 | Clerkin et al. | |
| 6,068,334 A | 5/2000 | Bonfilio | |
| 6,422,648 B1 | * 7/2002 | Hanagan | 297/215.12 |
| 6,568,699 B2 | * 5/2003 | McCann | 280/304.4 |

* cited by examiner

Primary Examiner—Laurie K. Cranmer
(74) Attorney, Agent, or Firm—Sturm & Fix LLP

(57) ABSTRACT

Many motorcycle seats do not have a backrest for the front rider (driver), nor is there provision for a backrest. A telescoping backrest, the mechanism of which is similar to that often used for automobile headrests, can provide the needed back support. It can be adjusted fore and aft, as well as up and down. It may be stowed out of the way by pushing it down to its lowest position.

14 Claims, 2 Drawing Sheets

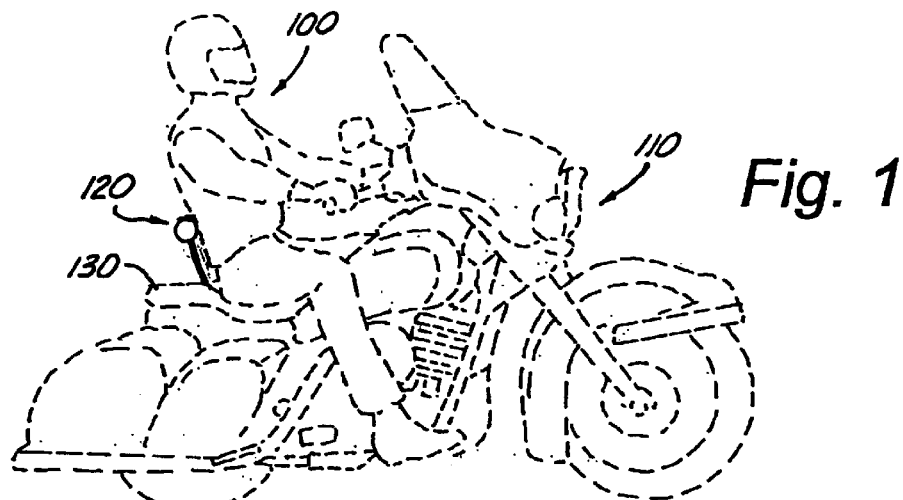
Fig. 1
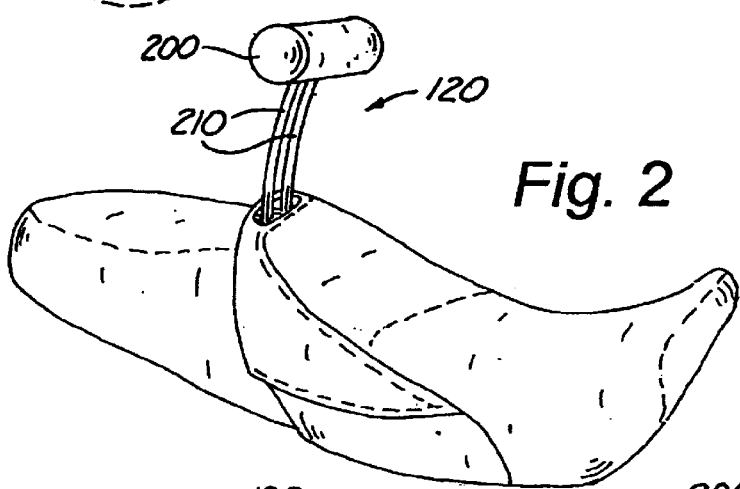
Fig. 2
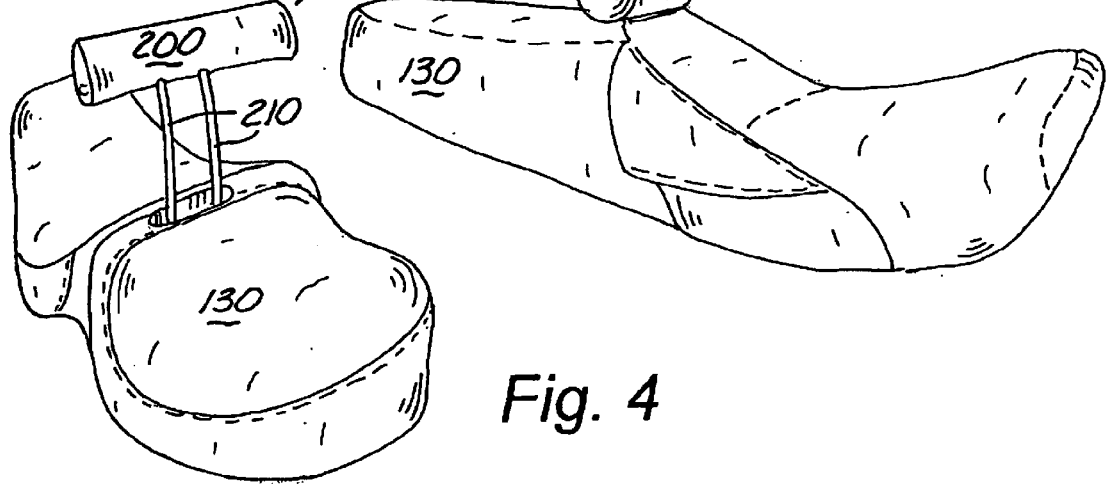
Fig. 3
Fig. 4

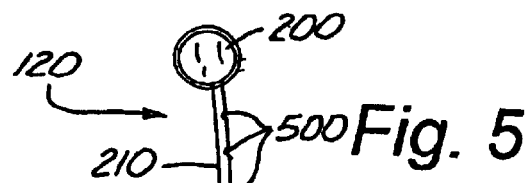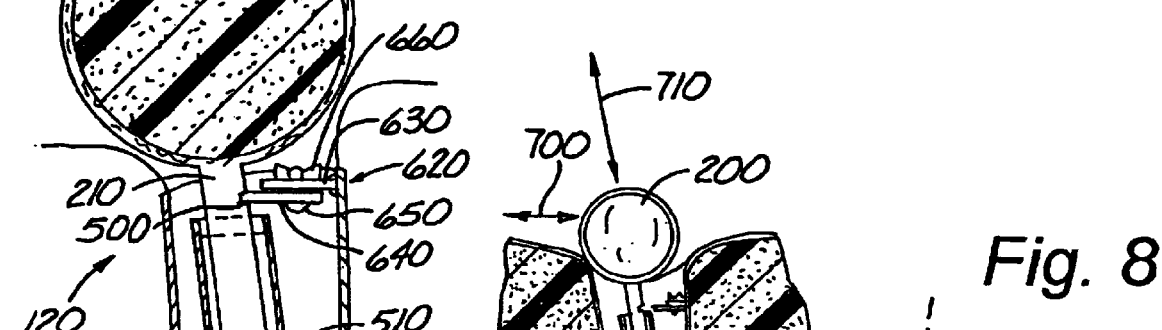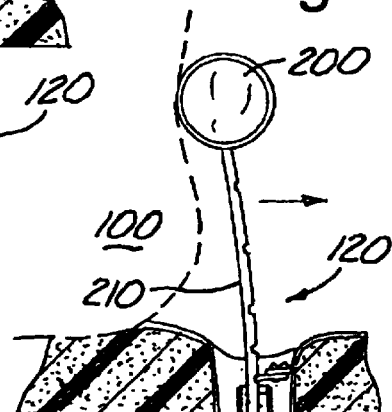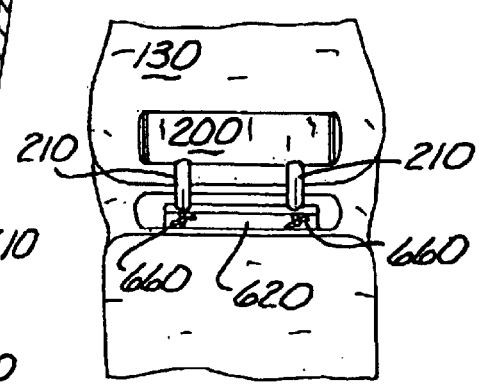

TELESCOPING MOTORCYCLE SEAT BACKREST

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates generally to a method and apparatus for enhancing a motorcycle seat. More particularly the present invention relates to an adjustable motorcycle seat backrest that telescopes up and down.

2. Background Art

A motorcycle seat, made for a driver and one rider, may not provide back support for either rider, but particularly the front rider or driver.

A motorcycle passenger seat ("rumble" seat) is disclosed in U.S. Pat. No. 6,068,334. The passenger seat incorporates a backrest that, when not in use, folds down and appears integrated into the rear fender of the motorcycle. The backrest hinges toward the rear of the fender.

Clerkin, et al., in U.S. Pat. No. 6,007,150 disclose a motorcycle seat having a backrest, the angle of which can be adjusted by various means. The height of the backrest is also variable, the backrest cushion sliding up and down on an upright brace. Because the backrest does not fold out of the way when not in use, the brace is removable from the seat, permitting the removal of the entire backrest.

In both U.S. Pat. Nos. 5,608,957 and 5,544,937, Hanagan disclosed a seat with backrests. Rectangular mounting posts are attached to the backrests and these are installed into rectangular slots in the seat structure. They are rigidly affixed to the motorcycle with locking screws. They are only pivotally adjustable (at the top of the mounting posts), and cannot be folded out of the way. If not needed, they are removed from the motorcycle. Since there is very little space to store things on a motorcycle, these backrests are often stored where the motorcycle is garaged and therefore may not be with the motorcycle when the backrests are desired to be used, for example when the motorcycle being used at a place not near the garage where the brackets are stored.

In U.S. Pat. No. 4,953,911, a passenger seat with a backrest similar to that revealed in U.S. Pat. No. 6,068,334 is disclosed. The backrest is hinged at the bottom and provides a cover for the passenger seat when not in use.

In U.S. Pat. No. 4,462,634, Hanagan describes an adjustable motorcycle seat. The seat has a backrest that is integral with the seat. The backrest is not removable, nor adjustable.

A seat cover for a motorcycle passenger seat is disclosed in U.S. Pat. No. 4,679,647. In doing so, a backrest for the passenger seat that is hinged at the bottom is also disclosed.

In U.S. Pat. No. 4,570,998, a backrest for a motorcycle seat is revealed. The backrest pivots at the end of a pair of rods that are pivotally connected to a bracket just above or on the motorcycle's fender. The back rest is for the front rider (or driver) of the motorcycle. The back rest can be folded back over the passenger seat when not in use, and in this position, becomes a higher seat for a passenger, lending to better visibility. It is not further adjustable.

U.S. Pat. No. 3,913,974 reveals a foldable backrest for a motorcycle seat. This back rest is for the front rider (or driver) of the motorcycle. The backrest, when not in use as a backrest, is a seat for a passenger. The passenger also has a backrest, but the passenger's backrest is permanently affixed to the seat. The front backrest pivots at its front and is held in its upright position by a brace. The brace has a plurality of notches in which its lower end can be inserted, and so the angle of the backrest is adjustable.

A backrest that pivots at the level of the motorcycle's rear fender is disclosed in U.S. Pat. No. 3,822,917. It also is made to slide along tracks on either side of the seat so it can be used for the front or rear passenger, and can further be adjusted for the comfort of either passenger. The backrest is angularly adjustable.

None of the above disclosed backrests telescope up and down. There is, therefore, a need for a motorcycle seat backrest that telescopes up and down as required by the rider, and is adjustable fore and aft.

BRIEF SUMMARY OF THE INVENTION

A purpose of this invention is to provide a backrest for a motorcycle seat. Another purpose is to provide for a motorcycle seat backrest that telescopes up and down, to remain out of the way when not needed and to be adjustable as to height when needed.

A telescoping backrest for a motorcycle is provided in a fashion similar to many telescoping headrests in automobiles. The backrest is comprised of a padded portion and two telescoping support rods. The telescoping support rods are seated in appropriate sockets, and have provisions for being held at various levels with a latch, detents or other methods. Rods, used as the telescoping members, are curved, as are the sockets these rods are fitted into. Adjustments forward and backward are provided by plates fitted with slotted holes into which threaded fasteners are inserted. The threaded fasteners are loosened and their positions in the slotted holes varied for the comfort of the rider.

When in the "down" position, the padded lower surface of the backrest is flush with the motorcycle seat, so it is not invisible. In this position, a depression or notch in the upper end of the telescopic support rods is engaged by a latch. To raise the backrest from its lowest position, the padded portion is pushed forward to release the notch from the latch, then the backrest may be pulled upward.

To return the telescopic motorcycle backrest to its lowest position from an upper position, the backrest's padded portion is, again, pulled forward to unlatch it, then pushed down.

Sockets (preferably made of steel) are provided into which the telescoping support rods are inserted, and providing the latching mechanisms to hold the backrest in the positions desired. The sockets are anchored to the structure of the motorcycle seat.

The novel features which are believed to be characteristic of this invention, both as to its organization and method of operation together with further objectives and advantages thereto, will be better understood from the following description considered in connection with the accompanying drawings in which a presently preferred embodiment of the

BRIEF DESCRIPTION OF THE SEVERAL VIEWS OF THE DRAWINGS

FIG. 1 shows a side elevation view of a motorcycle, a rider, and a telescoping backrest for the motorcycle's seat;

FIG. 2 is a perspective view of a motorcycle seat with a telescoping back rest in an upper position;

FIG. 3 is a perspective view of a seat with a telescoping back rest in a lowered position;

FIG. 4 is a perspective view from the rear of a motorcycle seat with a telescoping backrest in an upper position;

FIG. 5 is a side elevation view of a motorcycle seat with a portion broken away to show the telescoping backrest of the present invention in an upper position;

FIG. 6 shows an enlarged cross-sectional detail of a telescoping back rest in its lowered position;

FIG. 7 shows a side elevation cross-sectional view of the telescoping backrest in its lowered position with arrows showing forces to apply to raise and lower the telescoping backrest;

FIG. 8 shows a side elevation view of the telescoping backrest like FIG. 7, but showing it in its uppermost position with an arrow showing a force applied by the rider when making use of the telescoping backrest; and FIG. 9 shows a top plan view of a motorcycle seat telescoping backrest.

DETAILED DESCRIPTION OF THE INVENTION

A motorcycle rider 100, on a motorcycle 110 with a telescoping backrest 120 is shown in FIG. 1. The telescoping backrest 120 telescopes down into the motorcycle's seat 130.

The motorcycle seat 130 is shown in FIGS. 2 and 4 with the telescoping backrest 120 in an upper position. The telescoping backrest 120 comprises a padded portion 200 and support rods 210. The support rods 210 slide into the motorcycle seat 130 when the telescoping backrest 120 is lowered as shown in FIG. 3.

A cutaway view of the telescoping backrest 120 is shown in FIG. 5. The support rods 210 have multiple notches 500 formed or cut into them to permit the telescoping backrest 120 to be used at a plurality of heights. Also visible in the cutaway region is a socket 510, into which one of the support rods 210 is inserted.

FIG. 6 shows more details of the telescoping backrest 120 and the socket 510. The socket 510 is pivotally attached to the motorcycle seat 130 at pivot point 600. A spring 610 helps to raise the telescoping backrest 120.

The notches 500 in the support rods 210 are individually engaged by an adjustable latch 620. The adjustable latch 620 comprises two plates: a stationary (with respect to the motorcycle seat 130) plate 630 and a sliding plate 640. At least one of these two plates 630, 640 has slotted holes through which carriage bolts 650 are passed. A wing nut 660 is turned onto each of the carriage bolts 650. The sliding plate 640 is adjusted, fore and aft, for the comfort of the rider by loosening the wing nuts 660 on the carriage bolts 650 and adjusting the sliding plate forward or backward, then retightening the wing nuts 660.

The telescoping backrest 120 is disengaged from the adjustable latch 620 by applying a force in the forward direction. Once the adjustable latch 620 is free of the notch 500 it had engaged, the telescoping backrest 120 may be raised or lowered. When in an upright position, as seen in FIG. 8, a force applied by the rider 100 maintains the adjustable latch 620 in an engaged position in a notch 500 in each of the support arms 210.

In FIG. 7, the fore/aft arrow 700 is indicative of the fore and aft adjustment provided by the adjustable latch 620. As well, the up/down arrow 710 indicates the adjustment available in the vertical direction by choosing suitable notches 500 in the telescoping support rods 210.

A view, generally from above and behind is shown in FIG. 9. The adjustable latch 620 with its wing nuts 660 are clearly seen from this angle.

It is apparent many modifications and variations of the present invention are possible in light of the above teachings. It is, therefore, to be understood that within the scope of the appended claims, the invention may be practiced otherwise than as specifically described.

I claim:

1. A method for stowing a motorcycle seat backrest comprising a padded portion, and at least one pivotal telescoping support rod, the method comprising the steps of:
   (a) pivoting the telescoping support rod for the purpose of unlatching said at least one telescoping support rod from an upper position wherein, the unlatching is carried out by disengaging a latch from a notch in the at least one telescoping support rod, and the motorcycle seat backrest is adjustable fore and aft by adjusting the latch fore and aft; and
   (b) sliding the at least one telescoping support rod into a socket made to receive the telescoping support rod.

2. The method of claim 1 wherein the motorcycle seat backrest is pushed forward to disengage the latch from the notch in the at least one telescoping support rod.

3. The method of claim 1 wherein the at least one telescoping support rod has a plurality of notches into which the latch engages.

4. The method of claim 1 wherein the motorcycle seat backrest has two support rods.

5. A motorcycle seat backrest comprising:
   (a) a padded portion; and
   (b) at least one pivotable telescoping support rod supporting the padded portion, and provided with at least one notch in the back of the at least one support rod to pivotally engage a latch for maintaining the motorcycle seat backrest at a given height; wherein, the latch to which the at least one notch engages comprises: a stationary plate operably affixed to a motorcycle seat, a sliding plate, at least one slotted hole in at least one of the stationary plate and the sliding plate; and, at least one threaded fastener for slidably adjoining the sliding plate to the stationary plate.

6. The apparatus of claim 5 wherein the unlatching is carried out by disengaging the latch from the notch in the at least one telescoping support rod.

7. The apparatus of claim 6 wherein the motorcycle seat backrest is pushed forward to disengage the latch from the notch in the at least one telescoping support rod.

8. The apparatus of claim 5 wherein the motorcycle seat backrest is adjustable fore and aft by adjusting the latch fore and aft.

9. The apparatus of claim 5 wherein the at least one telescoping support rod has a plurality of notches into which the latch engages.

10. The apparatus of claim 5 wherein the motorcycle seat backrest has two support rods.

11. The apparatus of claim 5 additionally comprising at least one socket into which the at least one support rod slides.

12. The apparatus of claim 11 wherein the at least one socket is pivotally attached at a bottom of the socket to a motorcycle seat.

13. The apparatus of claim 12 additionally comprising a spring inside the at least one socket applying a force upwardly to the at least one support rod.

14. The apparatus of claim 5 additionally comprising a wing nut used on each of the at least one threaded fastener.

* * * * *